(12) United States Patent
Tsai

(10) Patent No.: US 6,880,907 B2
(45) Date of Patent: Apr. 19, 2005

(54) METHOD OF MAINTAINING EDGE QUALITY IN INK JET PRINTING

(75) Inventor: Jia-Hung Tsai, Taipei (TW)

(73) Assignee: BenQ Corporation, Tao-Yuan Hsien (TW)

(*) Notice: Subject to any disclaimer, the term of this patent is extended or adjusted under 35 U.S.C. 154(b) by 0 days.

(21) Appl. No.: 10/605,271

(22) Filed: Sep. 18, 2003

(65) Prior Publication Data

US 2005/0062777 A1 Mar. 24, 2005

(51) Int. Cl.⁷ .............................. B41J 2/205; B41J 2/21
(52) U.S. Cl. .......................................... 347/15; 347/43
(58) Field of Search ............................... 347/15, 43, 41

(56) References Cited

U.S. PATENT DOCUMENTS

| | | | |
|---|---|---|---|
| 5,602,572 A | * | 2/1997 | Rylander .................... 358/3.09 |
| 5,861,896 A | * | 1/1999 | Barton et al. ................ 347/15 |
| 6,183,062 B1 | | 2/2001 | Curtis .......................... 347/41 |
| 6,290,330 B1 | * | 9/2001 | Torpey et al. ................ 347/43 |
| 6,343,847 B1 | * | 2/2002 | Torpey et al. ................ 347/15 |
| 6,361,144 B1 | * | 3/2002 | Torpey et al. ................ 347/43 |
| 6,467,866 B1 | | 10/2002 | Nagoshi ....................... 347/15 |
| 6,497,467 B2 | | 12/2002 | Suwa ........................... 347/15 |
| 6,705,702 B2 | * | 3/2004 | Gunther et al. .............. 347/43 |

* cited by examiner

Primary Examiner—Stephen D. Meier
Assistant Examiner—Alfred Dudding
(74) Attorney, Agent, or Firm—Winston Hsu (57) ABSTRACT

A method for processing color image data for printing on a color ink jet printer includes reading color image data from a source image, the source image containing color image data of at least a first color area and a second color area. A border region is then identified between the first color area and the second color area. A pixel altering function alters pixels of the source image along the border region between the first color area and the second color area before the source image is converted into a plurality of halftone images. Finally, the halftone images are printed using ink of the first and second colors according to the first and second color areas.

22 Claims, 8 Drawing Sheets

| Image used for pixel altering | Memory used | Calculations |
|---|---|---|
| Halftone (byte) | km × kn | km × kn |
| Halftone (bit) | (km × kn)/8 | km × kn + km × kn |
| Source | m × n | m × n |

Fig. 8

METHOD OF MAINTAINING EDGE QUALITY IN INK JET PRINTING

BACKGROUND OF INVENTION

1. Field of the Invention

The present invention relates to an improved method of processing color image data for maintaining edge quality while printing on a color ink jet printer.

2. Description of the Prior Art

Liquid ink printers including inkjet printers deposit black and/or colored liquid inks which tend to spread when the ink is deposited on paper as a drop, spot, or dot. A problem of liquid ink printers is that the liquid inks used have a finite drying time, which tends to be somewhat longer than desired. Bleeding tends to occur when the drops are placed next to each other in a consecutive order or in a cluster of dots within a short time. Bleeding, spreading, and feathering causes print quality degradation including color shift, reduction in edge sharpness, and solid area mottle which includes density variations in said areas due to puddling of inks. Intercolor bleeding occurs when ink from one color area blends into or bleeds with ink from another color area. Intercolor bleeding is often most pronounced where an area of black ink (relatively slow drying) adjoins an area of color ink (relatively fast drying); however, intercolor bleeding can occur at the interface between areas of any color inks having substantially different properties such as dry time or permeability.

To solve this problem, many solutions have been proposed. In U.S. Pat. No. 6,183,062 entitled "Maintaining Black Edge Quality in Liquid Ink Printing" and assigned to Xerox Corporation, Curtis et al. teach a method for maintaining edge quality between black ink and colored ink, which is incorporated herein by reference.

Figure 1:
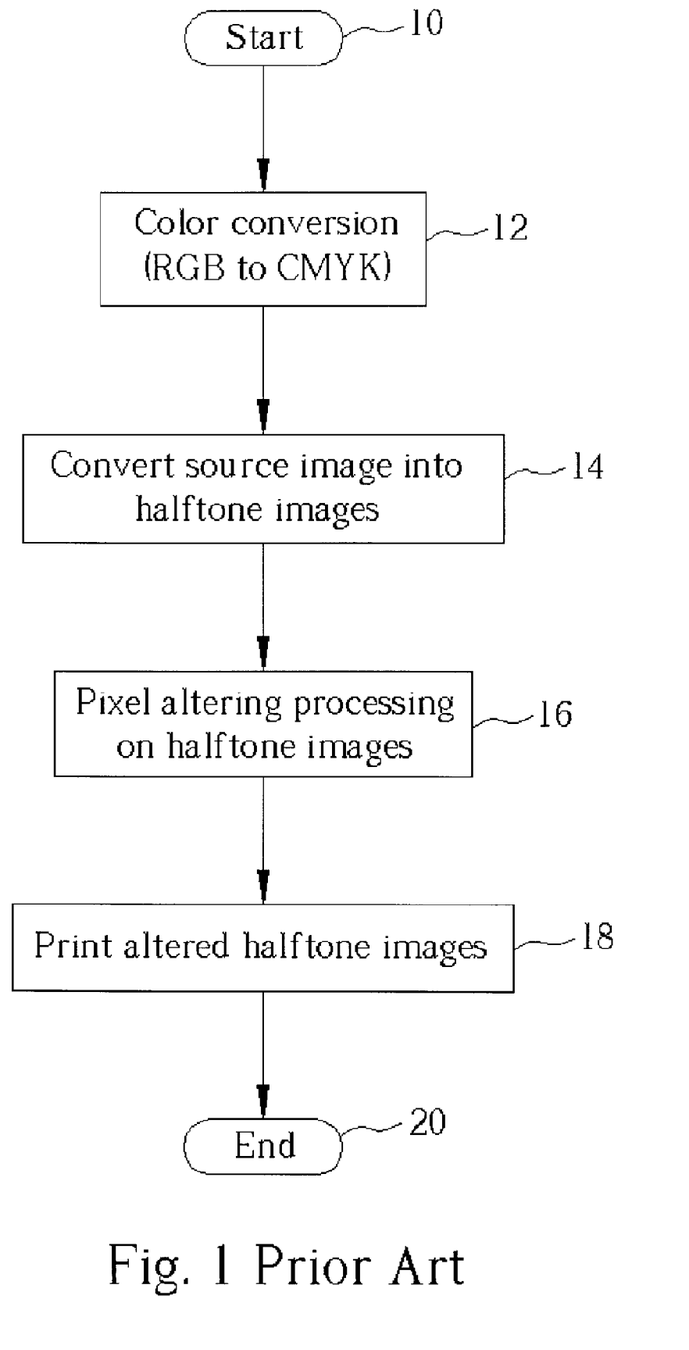
FIG. 1 is a flowchart illustrating printing color images according to the prior art.

Please refer to FIG. 1. FIG. 1 is a flowchart illustrating printing color images according to the prior art. Steps contained in the flowchart will be explained below.

Step 10: Start the process for printing a color source image;

Step 12: Perform a color conversion operation on the source image. This conversion typically involves converting red, green, and blue (RGB) colors into cyan, magenta, yellow, and black (CMYK);

Step 14: Convert the color image into a plurality of halftone images. For example, a color plane is produced for each of the CMYK colors, producing four halftone images;

Step 16: Pixel altering processing is performed on each of the halftone images;

Step 18: The altered halftone images are printed; and

Step 20: End.

Figure 2:
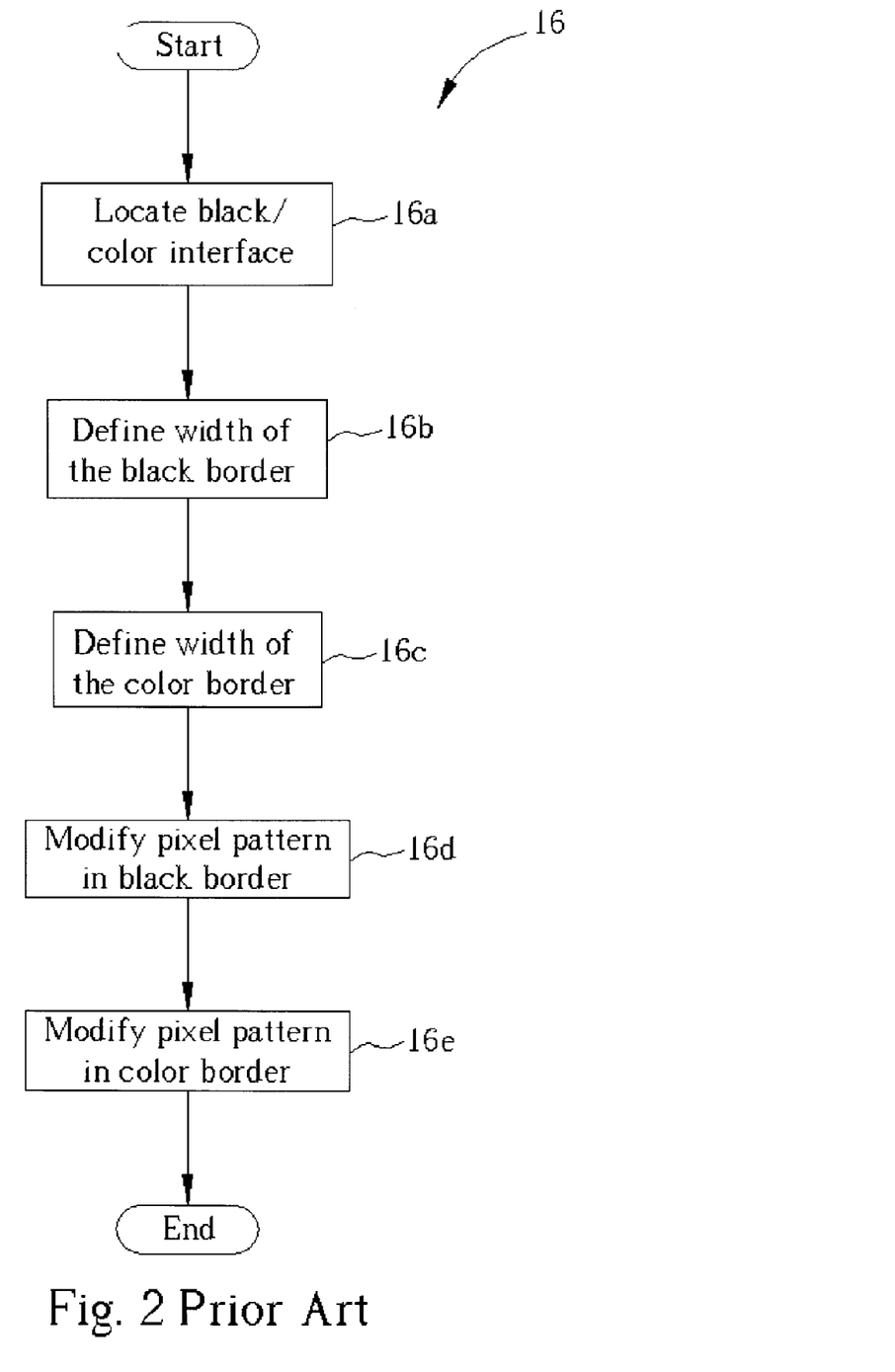
FIG. 2 shows a flowchart illustrating the prior art method for altering pixels in the halftone image for reducing intercolor bleeding.

To reduce intercolor bleeding, the prior art carries out a process that operates to detect black/color interfaces where intercolor bleeding is likely to occur and to modify the pixels that are to be printed near the borders of the interfaces. The process comprises three general steps: identifying an interface between a black area and a color area; modifying the pixel pattern in a black border region in the black area; and modifying the pixel pattern in a color border region in the color area. Please refer to FIG. 2. FIG. 2 shows a flowchart illustrating the prior art method for altering pixels in the halftone image for reducing intercolor bleeding.

Step 16a identifies an interface between a black area and a color area. In one embodiment, described in more detail below, step 16a collects statistics for pixels within an X×Y window filter to identify an interface and determine if a given pixel is within either border region. However, step 16a can use any number of known techniques including, but not limited to, masking, look-up tables, edge detection filters, etc. to identify a black/color interface. A discussion of edge detection filters can be found in U.S. Pat. No. 5,635,967.

Step 16b defines a width N of the black border region near the black/color interface identified in step 16a. The number of pixels N comprising the black border region should be large enough to reduce intercolor bleeding at the border and small enough to minimize the formation of additional printing artifacts that would likewise reduce image quality. Similarly, step 16c defines the width M of the color border region near the interface. As with the selection of black border region, the width M of the color border region should be selected to reduce intercolor bleeding while minimizing the addition of other printing artifacts.

When defining the width of the border regions consideration may be given to such factors as the position of the border regions, the type of image (e.g., text, line art, graphics, pictorial, etc.), the width of each border, how the pixel pattern within a border will be modified, the print medium used, ink composition, etc. Each of the border regions beneficially are positioned to abut the interface; however, it is understood that the border region need not abut the interface. The total width of the border regions at an interface should be selected to reduce intercolor bleeding at an interface and minimize the formation of additional printing artifacts. Optimum values for border width can be identified through calibration and image analysis studies. The width of the black border is preferably between 0 and 350 μm, and the width of the color border is preferably between 0 and 200 μm. Beneficially, for a 300 dpi ink jet, the width of the N pixel black border is selected from 0 to 4 pixels, and the width M of the color border is defined to be from 0 to 2 pixels.

Figure 3:
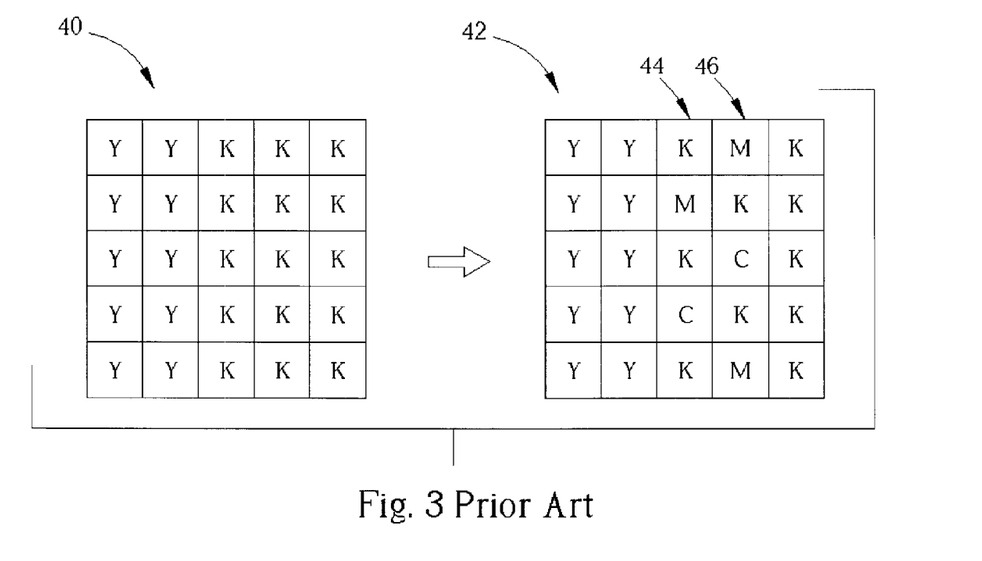
FIG. 3 illustrates an example of a pixel substitution operation.

Steps 16d and 16e modify the pixel pattern within the N-pixel black border and M pixel color border regions, respectively. A number of methods exist to modify the pixels or pixel pattern within the border regions. One method of modifying the pixel pattern within a border region replaces selected pixels with a predetermined combination of separation pixels. The replacement operation effectively turns off the separation pixel this is being replaced and turns on the separation pixel(s) replacing it. The replacement of pixels is sometimes referred to as "substitution" or "replacing". An example of a substitution operation is illustrated in FIG. 3. In FIG. 3, window 40 shows a 5×5 block of composite pixels along a yellow/black interface. Window 42 shows the pixel block of window 40 after a substitution operation wherein within a 2 pixel border (columns 44 and 46) every other pixel in the black separation is turned off and replaced with alternating cyan and magenta pixels in the composite image.

Figure 4:
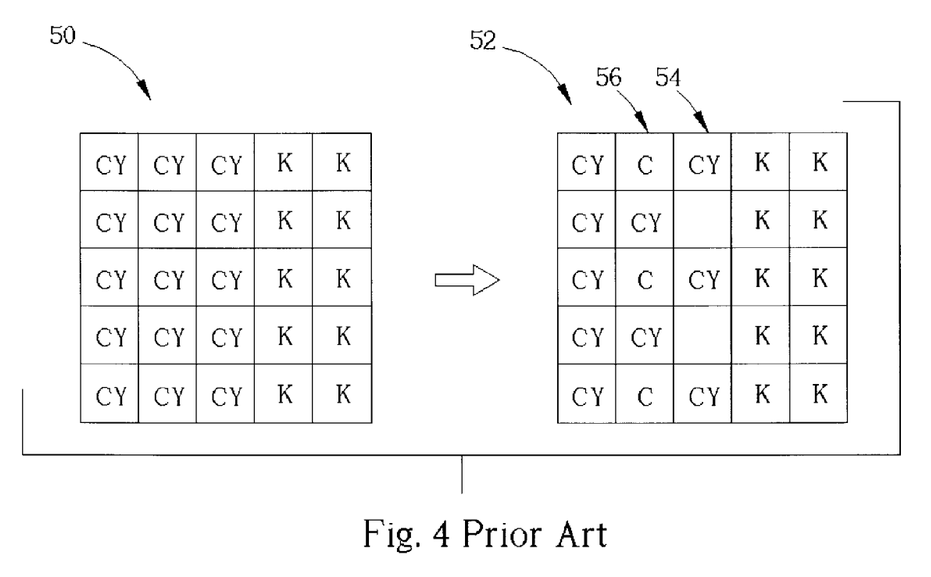
FIG. 4 and FIG. 5 illustrate examples of pixel thinning operations.

Another method of modifying a pixel pattern removes (turns off) selected pixels in one or more separations from the composite image. This removal of pixels from separations is sometimes referred to as "thinning" or "reducing". FIG. 4 illustrates an example of a thinning operation wherein window 50 is a 5×5 pixel block of composite pixels along a black/color interface and window 52 shows the same image block after thinning. The thinning operation removes (turns off) all color separation pixels from every other pixel in column 54 and removes yellow separation pixels from every other pixel in column 56.

Figure 5:
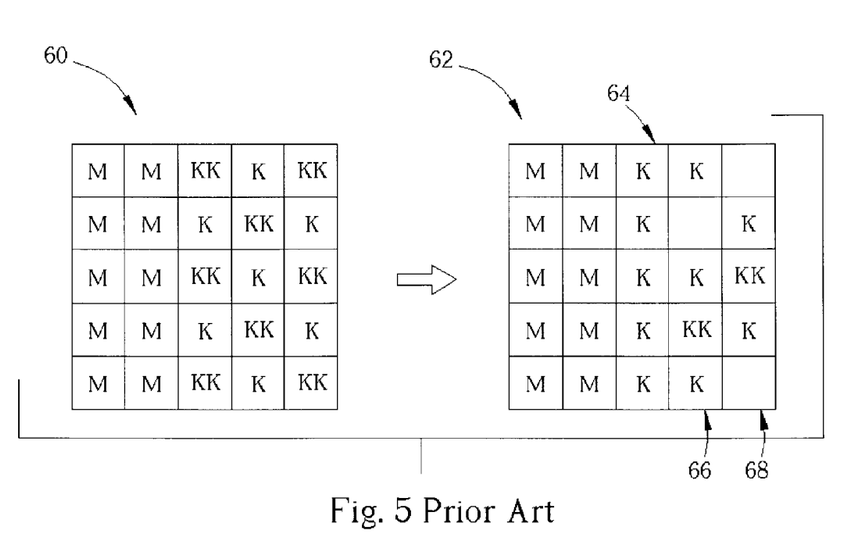

A thinning operation can also be used to reduce the ink coverage in a multiple drop per pixel printer. Briefly, in a multi-drop per pixel printer small ink drops are often used to produce good tone transitions in graphical and pictorial images. However, the size of these drops are not large enough to produce a solid area fill or saturated colors using only one drop per pixel, thereby reducing the color saturation value for that pixel. Thus, the printer typically requires greater than 100% coverage, that is, multiple drops per separation pixel to obtain solid area fill. In FIG. 5 window 60 illustrates a 5×5 pixel area along a black/color interface wherein the black region comprises 150% coverage (i.e., an average of three drops for every two pixels). Window 62 shows the same image area as window 60 after a thinning operation to reduce the drop coverage to approximately 100%, ie., an average of one drop per separation pixel. In window 62, column 64 illustrates a thinning operation that reduces all two drop pixels to one drop pixels. Columns 66 and 68 illustrate a thinning method that removes approximately half of the two drop pixels.

As shown in steps 14 and 16 of the flowchart of FIG. 1, the prior art method involves first converting the source image into halftone images, and then altering the pixels of the halftone images in order to reduce intercolor bleeding. Unfortunately, if the halftone images have a higher resolution than the source image, many extra calculations and extra memory are required to alter pixels on the halftone images as compared to altering the pixels on the source image.

SUMMARY OF INVENTION

It is therefore a primary objective of the claimed invention to provide a method for processing color image data in order to solve the above-mentioned problems.

According to the claimed invention, a method for processing color image data for printing on a color ink jet printer is disclosed. The method includes reading color image data from a source image, the source image containing color image data of at least a first color area and a second color area. A border region is then identified between the first color area and the second color area. A pixel altering function alters pixels of the source image along the border region between the first color area and the second color area before the source image is converted into a plurality of halftone images. Finally, the halftone images are printed using ink of the first and second colors according to the first and second color areas.

It is an advantage of the claimed invention that the method alters the pixels of the source image before converting the source image into a plurality of halftone images. When the resolution of the halftone images is greater than the resolution of the source image, a significant number of calculations and memory are saved by altering the source image directly before the conversion to halftone images.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 6:
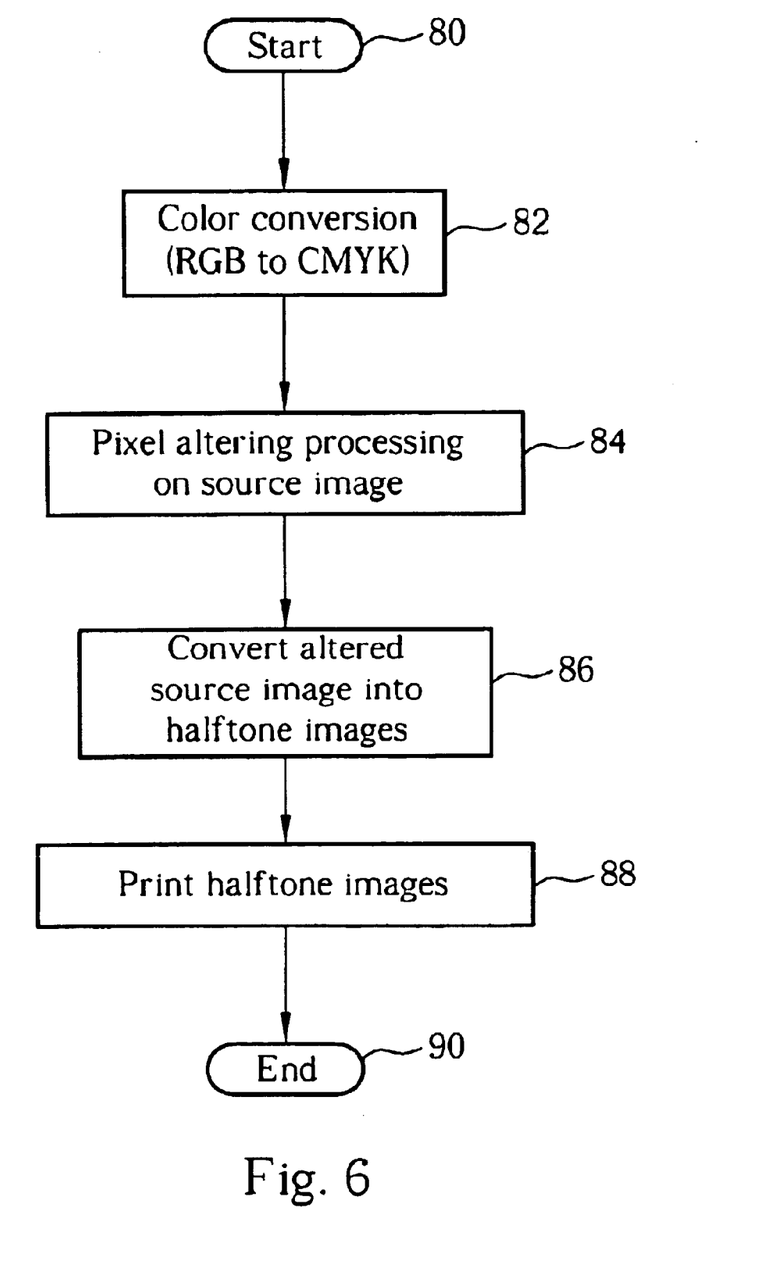
FIG. 6 is a flowchart illustrating printing color images according to the present invention.

Please refer to FIG. 6. FIG. 6 is a flowchart illustrating printing color images according to the present invention. Steps contained in the flowchart will be explained below.

Step 80: Start the process for printing a color source image;

Step 82: Perform a color conversion operation on the source image. This conversion typically involves converting red, green, and blue (RGB) colors into cyan, magenta, yellow, and black (CMYK). However, the source image can also be converted into other colors. Colors such as light cyan, light magenta, orange, and green can also be used. At this point, the source image is a continuous tone source image, meaning that the image is represented by a high number of colors, which approximates an unlimited variety of colors:

Step 84: Pixel altering processing is performed on the source image;

Step 86: Convert the altered source image into a plurality of halftone images. For example, a color plane is produced for each of the CMYK colors, producing four halftone images;

Step 88: The halftone images are printed; and

As shown in steps 84 and 86 above, the pixel altering for reducing intercolor bleeding is performed on the source image. After the pixel altering process, the source image is then converted into the halftone images. Like the prior art method, the present invention method corrects intercolor bleeding along a border between two different colors of ink. For instance, suppose that black pigment-based ink is used as a first color and either cyan, magenta, or yellow dye-based ink is used as a second color. Since the pigment-based ink and the dye-based ink have different properties, and dry at different rates, the two ink colors may bleed together unless pixel altering processes such as reduction and replacement are used.

Figure 7:
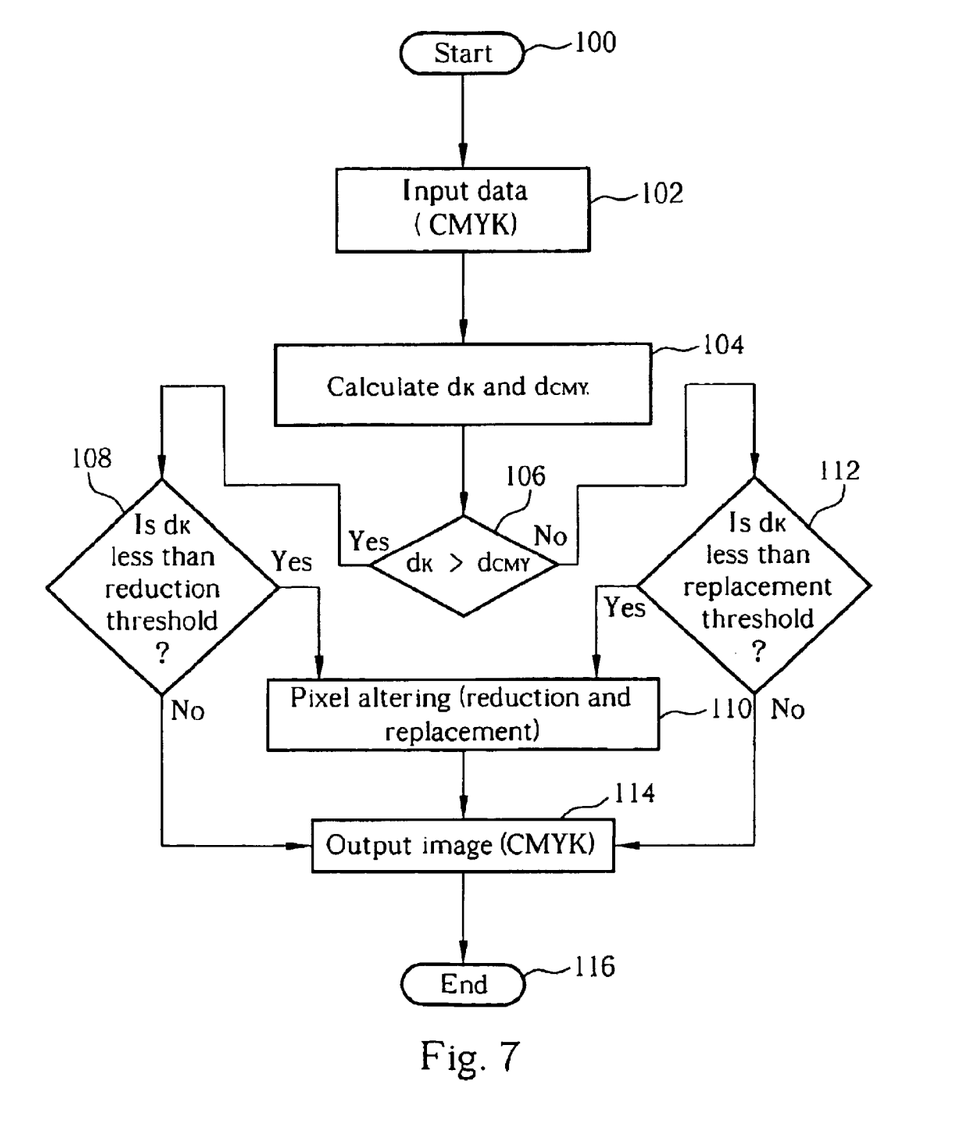
FIG. 7 is a flowchart showing conditions for executing the pixel altering process of the present invention.

Please refer to FIG. 7. FIG. 7 is a flowchart showing conditions for executing the pixel altering process of the present invention. Steps contained in the flowchart will be explained below.

Step 100: Start;

Step 102: Input the source image color data for cyan, magenta, yellow, and black (CMYK) colors. Instead, the source image color data can also include color data for light cyan, light magenta, orange, and green colors;

Step 104: Calculate a density of black pixels $d_k$ and a density of color pixels $d_{CMY}$ for the source image;

Step 106: Determine if the density of black pixels $d_k$ is greater than the density of color pixels $d_{CMY}$; if so, go to step 108; if not, go to step 112;

Step 108: Determine if the density of black pixels $d_K$ is less than the pixel reduction threshold value; if so, go to step 110; if not, go to step 114;

Step 110: A border region between the black pixels and the color pixels is identified. To improve the printing quality at the border region, the pixel altering process is performed, including reduction and/or replacement of pixels;

Step 112: Determine if the density of black pixels $d_K$ is less than the pixel replacement threshold value; if so, go to step 110; if not, go to step 114;

Step 114: Output the source image having cyan, magenta, yellow, and black (CMYK) colors; and Step 116: End.

In step 110, the pixel altering process of the present invention can use either or both of the pixel reduction and pixel replacement techniques that were illustrated in FIG. 2 through FIG. 5. However, instead of altering pixels of the halftone images, the present invention alters the pixels of the source image. Suppose the variable k is a scalar value equal to the ratio of each linear dimension of the halftone images to the corresponding linear dimension of the source image. When the resolution of the halftone images is greater than the resolution of the source images, the advantages of the present invention method are greatest.

Since each halftone image is a series of monochromatic dots, each halftone image can use either a bit of data or a byte of data to store information for each dot. While using only one bit per dot for the prior art method provides the most efficient use of memory, extra calculations are required to extract the data stored in bit format.

Figure 8:
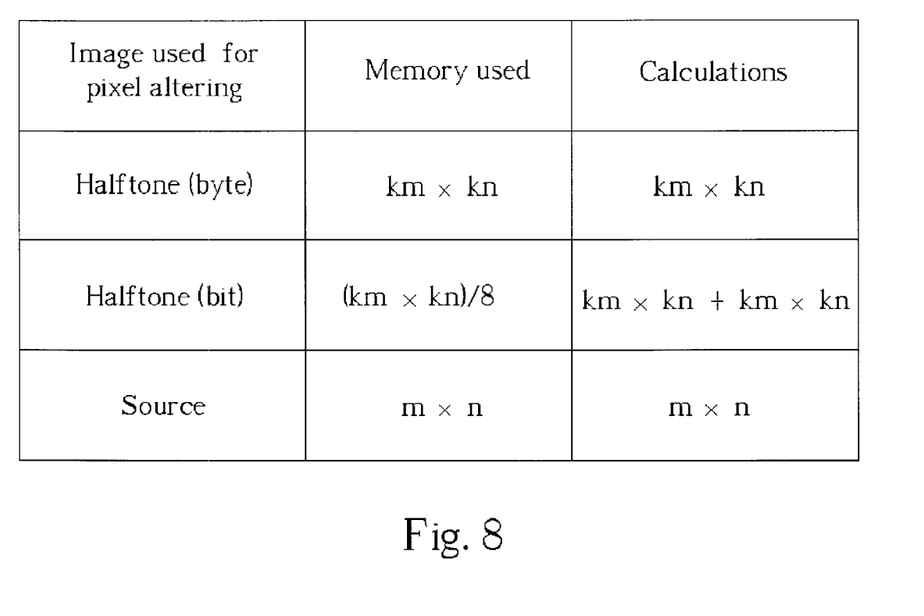
FIG. 8 is a chart comparing memory and calculations required by the present invention method to the prior art method.

Please refer to FIG. 8. FIG. 8 is a chart comparing memory and calculations required by the present invention method to the prior art method. As stated above, k is represents the ratio of linear resolution of the halftone image to the linear resolution of the source image. For example, if the source image has a resolution of 600×600 pixels, and each halftone image has a resolution of 1200×1200 pixels, then k=1200/600=2. Assume that the dimensions of the source image are m×n pixels, where m and n are positive integers. Each of the halftone images would then have dimensions of km×kn. The chart in FIG. 8 shows the magnitude of the amount of memory used and the number of calculations needed when altering pixels in the halftone images according to the prior art, and compares these quantities to those used when altering pixels in the source image according to the present invention. Other factors that are identical for both the prior art and the present invention are not shown in FIG. 8 for simplicity.

The halftone images can use either a whole byte or one bit to store information for each pixel in the halftone images. Both of these cases are shown in FIG. 8. First, the prior art method of altering the halftone images stored in the byte format will be compared to the present invention method of altering the source image. Each dimension of the halftone image is larger than that of the source image by the factor k, and this is reflected in FIG. 8. The memory used by the halftone image in the byte format is km×kn bytes, whereas the memory used for the source image is only m×n bytes. Likewise, the more pixels there are in an image, the more calculations will be needed for performing the pixel altering processing. Therefore, the number of calculations needed for the halftone image in the byte format is km×kn, while the number of calculations needed for the source image is m×n. From the chart shown in FIG. 8, the benefit of the present invention becomes clear. The present invention takes advantage of the fact that the source image has a smaller resolution than the halftone images, and saves both memory and calculations by performing the pixel altering processing on the source image instead of the halftone images.

For the halftone image stored in the bit format, less memory is needed to store pixel information than with the byte format. Assuming there are eight bits per byte, the bit format uses just one-eighth of the total memory that the byte format uses for storing halftone images. Unfortunately, this memory savings comes with a cost, and the number of calculations required is doubled. The number of pixels remains equal to km×kn, but an additional km×kn number of calculations is needed to handle the over-head of accessing individual bits in memory. Therefore, while it is possible that the prior art method using halftone images stored in bit format may actually save memory as compared to the present invention method, the number of calculations will be far greater.

As compared to the prior art, the present invention method of altering pixels in the source image saves memory and calculations required for correcting intercolor bleeding. When the factor k is equal to one (when the halftone images have the same resolution as the source image), the present invention method uses the same amount of memory and number of calculations as the prior art method. However, for any values of k greater than 1, the present invention method is more efficient at performing the pixel altering process. Thus, the present invention takes advantage of the relatively smaller resolution of the source image to alter pixels before converting the source image into the halftone images.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of processing color image data for printing on a color ink jet printer, the method comprising:

reading color image data from a source image, the source image containing color image data of at least a first color area and a second color area;

calculating a first density of pixels of the first color, calculating a second density of pixels of the second color, and comparing the first density to the second density;

identifying a border region between the first color area and the second color area only if the first density and the second density match predetermined criteria which necessitates altering pixels along the border, performing a pixel altering function to alter pixels of the source image along the border region between the first color area and the second color area;

converting the source image into a plurality of halftone images after performing the pixel altering function; and printing the halftone images using ink of the first and second colors according to the first and second color areas.

2. The method of claim 1 wherein the first color ink and the second color ink are two different types of ink.

3. The method of claim 2 wherein the first color ink is a pigment-based ink and the second color ink is a dye-based ink.

4. The method of claim 1 wherein the first color is black and the second color is selected from a group consisting of cyan, magenta, yellow, light cyan, light magenta, orange, and green.

5. The method of claim 4 wherein the first color ink is a pigment-based ink and the second color ink is a dye-based ink.

6. The method of claim 1 wherein the pixel altering function comprises replacing pixels of the first color with pixels of another color.

7. The method of claim 1 wherein the pixel altering function comprises replacing pixels of the second color with pixels of another color.

8. The method of claim 1 wherein the pixel altering function comprises reducing a color saturation value for pixels of the first color.

9. The method of claim 1 wherein the pixel altering function comprises reducing a color saturation value for pixels of the second color.

10. The method of claim 1 wherein if the first density is higher than the second density, the pixels along the border region are altered according to a comparison result between the first density and a first threshold level.

11. The method of claim 1 wherein if the second density is higher than the first density, the pixels along the border region are altered according to a comparison result between the first density and a second threshold level.

12. A method of processing color image data for printing on a color ink jet printer, the method comprising:

reading color image data from a continuous tone source image, the continuous tone source image containing color image data of at least a first color area and a second color area;

calculating a first density of pixels of the first color, calculating a second density of pixels of the second color, and comparing the first density to the second density;

identifying a border region between the first color area and the second color area only if the first density and the second density match predetermined criteria which necessitates altering pixels along the border;

performing a pixel altering function to alter pixels of the continuous tone source image along the border region between the first color area and the second color area;

converting the continuous tone source image into a plurality of halftone image after performing the pixel altering function; and printing the halftone images using ink of the first and second colors according to the first and second color areas.

13. The method of claim 12 wherein the first color ink and the second color ink are two different types of ink.

14. The method of claim 13 wherein the first color ink is a pigment-based ink and the second color ink is a dye-based ink.

15. The method of claim 12 wherein the first color is black and the second color is selected from a group consisting of cyan, magenta, yellow, light cyan, light magenta, orange, and green.

16. The method of claim 15 wherein the first color ink is a pigment-based ink and the second color ink is a dye-based ink.

17. The method of claim 12 wherein the pixel altering function comprises replacing pixels of the first color with pixels of another color.

18. The method of claim 12 wherein the pixel altering function comprises replacing pixels of the second color with pixels of another color.

19. The method of claim 12 wherein the pixel altering function comprises reducing a color saturation value for pixels of the first color.

20. The method of claim 12 wherein the pixel altering function comprises reducing a color saturation value for pixels of the second color.

21. The method of claim 12 wherein if the first density is higher than the second density, the pixels along the border region are altered according to a comparison result between the first density and a first threshold level.

22. The method of claim 12 wherein if the second density is higher than the first density, the pixels along the border region are altered according to a comparison result between the first density and a second threshold level.

* * * * *